United States Patent
Kelley et al.

(10) Patent No.: US 10,924,951 B2
(45) Date of Patent: Feb. 16, 2021

(54) MEASUREMENT CONFIGURATION AND REPORTING WITH DIVERSE TRAFFIC

(71) Applicant: Nokia Solutions and Networks Oy, Espoo (FI)

(72) Inventors: Sean Kelley, Hoffman Estates, IL (US); Ilkka Keskitalo, Oulu (FI); Malgorzata Tomala, Wroclaw (PL)

(73) Assignee: HMD Global Oy, Espoo (FI)

( * ) Notice: Subject to any disclaimer, the term of this patent is extended or adjusted under 35 U.S.C. 154(b) by 2 days.

(21) Appl. No.: 14/428,714

(22) PCT Filed: Sep. 17, 2012

(86) PCT No.: PCT/IB2012/054920
§ 371 (c)(1),
(2) Date: Mar. 17, 2015

(87) PCT Pub. No.: WO2014/041406
PCT Pub. Date: Mar. 20, 2014

(65) Prior Publication Data
US 2015/0281990 A1    Oct. 1, 2015

(51) Int. Cl.
*H04W 24/10*    (2009.01)
*H04L 12/26*    (2006.01)
(Continued)

(52) U.S. Cl.
CPC ............ *H04W 24/10* (2013.01); *H04L 1/24* (2013.01); *H04L 43/06* (2013.01); *H04W 24/02* (2013.01);
(Continued)

(58) Field of Classification Search
None
See application file for complete search history.

(56) References Cited

U.S. PATENT DOCUMENTS 8,731,543 B2    5/2014  Jung et al.
8,923,178 B2    12/2014 Anderson et al.
(Continued)

FOREIGN PATENT DOCUMENTS

EP           2 448 314 A2    5/2012
WO    WO 2012/047025 A2    4/2012

OTHER PUBLICATIONS

NEC; "Mechanisms for reduction of redundant MDT data"; S5-121875; 3GPP TSG SA WG5 (Telecom Management) Meeting #84; Aug. 20-24, 2012; Berlin, Germany; whole document (2 pages).
(Continued)

*Primary Examiner* — Nicholas Sloms
(74) *Attorney, Agent, or Firm* — Harrington & Smith

(57) ABSTRACT

These teachings present a new minimization of drive test MDT mode which is valid when the user equipment UE is in an idle state and in a connected state and across the state transitions. The extended logged MDT configuration according to this mode may be configured for the UE by the network, or autonomously by the UE itself. In some embodiments it is associated with the UE reporting its preference for power optimized configuration indication. Some embodiments have a minimum threshold to assure any MDT report from this mode has a sufficient volume of data or sufficient number of data points logged, and so is well suited for smart phones with always-on applications. The parameters such as logging periodicity can differ between the idle and connected state even for a given extended logged MDT configuration.

22 Claims, 3 Drawing Sheets

(51) Int. Cl.
*H04W 24/02* (2009.01)
*H04L 1/24* (2006.01)
*H04W 52/02* (2009.01)
*H04W 24/08* (2009.01)
*H04W 88/02* (2009.01)

(52) U.S. Cl.
CPC ........ *H04W 52/0209* (2013.01); *H04W 24/08* (2013.01); *H04W 88/02* (2013.01); *Y02D 30/70* (2020.08)

(56) References Cited

U.S. PATENT DOCUMENTS

| | | | |
|---|---|---|---|
| 9,100,846 B2* | 8/2015 | Bodog | H04W 24/10 |
| 2008/0160918 A1* | 7/2008 | Jeong | H04W 52/0216 |
| | | | 455/67.11 |
| 2010/0190488 A1* | 7/2010 | Jung | H04W 24/10 |
| | | | 455/424 |
| 2011/0183661 A1* | 7/2011 | Yi | H04W 24/10 |
| | | | 455/422.1 |
| 2011/0183662 A1 | 7/2011 | Lee et al. | |
| 2011/0201279 A1* | 8/2011 | Suzuki | H04W 24/10 |
| | | | 455/67.11 |
| 2011/0250880 A1* | 10/2011 | Olsson | H04W 76/18 |
| | | | 455/423 |
| 2011/0250893 A1 | 10/2011 | Lee et al. | 455/437 |
| 2011/0276838 A1 | 11/2011 | Zhou et al. | |
| 2012/0082051 A1* | 4/2012 | Kim | H04W 24/10 |
| | | | 370/252 |
| 2012/0083263 A1 | 4/2012 | Kim et al. | 455/423 |
| 2012/0088457 A1 | 4/2012 | Johansson et al. | |
| 2012/0113837 A1* | 5/2012 | Siomina | H04W 24/10 |
| | | | 370/252 |
| 2012/0275364 A1 | 11/2012 | Anderson et al. | |
| 2012/0275366 A1* | 11/2012 | Anderson | H04W 52/0219 |
| | | | 370/311 |
| 2013/0012188 A1* | 1/2013 | Gao | H04W 24/10 |
| | | | 455/422.1 |
| 2013/0029666 A1* | 1/2013 | Jung | H04W 36/0085 |
| | | | 455/436 |
| 2013/0040659 A1* | 2/2013 | Van Der Velde | H04W 24/10 |
| | | | 455/456.1 |
| 2013/0065535 A1* | 3/2013 | Zhou | H04W 16/18 |
| | | | 455/67.11 |
| 2013/0077508 A1 | 3/2013 | Axmon et al. | |
| 2013/0121204 A1 | 5/2013 | Lee et al. | |
| 2013/0203357 A1* | 8/2013 | Chuang | H04W 24/04 |
| | | | 455/67.11 |
| 2015/0139020 A1* | 5/2015 | Kim | H04W 24/10 |
| | | | 370/252 |

OTHER PUBLICATIONS

NTT Docomo, Inc. et al.; "Location Information in event Ax, Bx measurement report for Immediate MDT"; R2-123707; 3GPP TSG-RAN2#79; Aug. 13-17, 2012; Qingdao, China; whole document (3 pages).
NEC; "Add mechanism for reduction of redundant MDT data"; Change Request, S5-121876; 3GPP TSG-SA5 Meeting #84; Aug. 20-24, 2012; Berlin, Germany; whole document (6 pages).
Ericsson et al.; "Logged MDT measurement reporting"; Tdoc R2-101994; 3GPP TSG-RAN WG2 #69bis; Apr. 12-16, 2010; Beijing, China; whole document (2 pages).
Kyocera; "MDT logging stoppage based on battery threshold level"; R2-105607; 3GPP TSG-RAN WG2 #71bis; Oct. 11-15, 2010; Xi'an, China; whole document (2 pages).
3GPP TS 32.422 V10.8.0 (Jun. 2012), "3$^{rd}$ Generation Partnership Project; Technical Specification Group Services and System Aspects; Telecommunication management; Subscriber and equipment trace; Trace control and configuration management (Release 10)", 121 pgs.
3GPP TS 36.331 V10.6.0 (Jun. 2012), "3$^{rd}$ Generation Partnership Project; Technical Specification Group Radio Access Network; Evolved Universal Terrestrial Radio Access (E-UTRA); Radio Resource Control 9RRC); Protocol specification (Release 10)", 302 pgs.
3GPP TS 37.320 V11.0.0 (Jun. 2012), "3$^{rd}$ Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); overall description; Stage 2 (Release 11)", 20 pgs.
"3$^{rd}$ Generation Partnership Project; Technical Specification Group Radio Access Network; Radio Resource Control (RRC); Protocol specification (Release 11)", 3GP TS 25.331 V11.2.0, Sections 11.2 and 11.3, Jun. 2012, 416 pgs.

* cited by examiner

MEASUREMENT CONFIGURATION AND REPORTING WITH DIVERSE TRAFFIC

TECHNICAL FIELD

The exemplary and non-limiting embodiments of this invention relate generally to wireless communication systems, methods, devices and computer programs and, more specifically, relate to measurement collecting and reporting in a wireless communication system, sometimes termed minimization of drive tests.

BACKGROUND

Wireless network operators are strongly motivated to use resources in an efficient way, both in order to maximize their own profit and to provide services to customers at a reasonable price. Network optimization, that is, the placement and configuration of resources so as to maximize the area in which coverage is provided and the quality of service provided by that coverage, contributes greatly to the efficient use of resources. One way in which operators carry out network optimization is through drive testing, in which employees of an operator carry a device, such as user equipment (UE) with specialized measurement capabilities, through the service area of a network. The device is usually carried in an automobile, and as the employee drives to various points within the service area, the device collects data relating to the quality of the service that is being made available to it. Drive testing is obviously costly due to equipment and labor expenses, and particularly as the drive tests have to be repeated every time changes are made for the network configuration. Furthermore, the unnecessary use of automobiles contributes to air pollution and also presents some measure of personal danger to the employees performing the testing, because the possibility of traffic accidents is always present.

In order to minimize drive testing, operators are more and more turning to mechanisms that take advantage of the fact that customer devices are constantly receiving service in numerous locations throughout their service areas and that receiving information relating to the service experience of multiple devices can substitute for drive testing in many cases and can reduce or eliminate the need for drive testing. 3GPP release 10 includes a feature called "Minimization of Drive Tests" (MDT), which provides the ability for operators to gather information such as radio measurements which are associated with customer UEs and use this information to assist network optimization.

3GPP release 10 specifications relating to MDT for the LTE and UMTS radio access technologies may be found, for example, in 3GPP TS 32.422, TS 37.320, TS 36.331, and TS 25.331. There are two modes of MDT operation: Immediate MDT and Logged MDT. In Immediate MDT, UE-based information and eNodeB-based information are collected by the eNodeB while the UE is in the connected state and conveyed to a data storage server known as a trace collection entity (TCE). In Logged MDT, the UE stores UE-based information in a log while in the idle state, and the log is collected by the eNodeB and conveyed to a TCE at a later point in time when the UE is in the connected state. Examples of UE-based information are location information such as Global Navigation Satellite System (GNSS) coordinates, or downlink radio measurements such as Reference Signal Received Power (RSRP) or Reference Signal Received Quality (RSRQ). An example of eNodeB-based information is uplink radio measurements such as Received Interference Power measurement.

The basic principles of MDT are expected to remain for 3GPP release 11. However, there is a work item to explore enhancements for Diverse Data Applications (eDDA) with the purpose of addressing potential issues that may arise from the prevalence of smart phones having 'always-on' applications running, such as email, RSS feeds, social network monitoring and the like. These applications require a constant or near constant connection with the network but will typically generate only intermittent traffic, generally small packets in the background without active usage of the terminal applications.

Relatedly, the UE can indicate if it wishes a power optimized configuration by sending a "preference for power optimized configuration" indication to the network. Such an indication informs the network that the UE prefers to be in a reduced power consumption state as compared to some default power consumption state.

There are in general two ways the network deals with the UE's 'always-on' applications. One way is for the network to release the UE's connection shortly after the always-on application's data transfer. This typically results in frequent state transitions between idle and connected states for the UE. If the UE is also configured for logged MDT there will be frequent retrieval of logged MDT data, and so the MDT reports will each have only a scant number of samples due to the frequent state transitions which is not very efficient for the network's MDT purposes. The other way is for the network to keep the UE in connected state and configure the UE's discontinuous reception (DRX) to a very long interval, which allows the UE to sleep during the DRX period of the DRX cycle and thus conserve battery power. If the UE is also configured for immediate MDT there can be additional signalling which can negate the intended power savings from the long DRX period.

SUMMARY

According to a first aspect of the invention there is a method comprising: logging measurements in a user equipment while the user equipment is in an idle state and while the user equipment is in a connected state according to an extended logged minimization of drive test configuration; and thereafter sending uplink a report comprising the measurements logged while the user equipment was in the idle state and while the user equipment was in the connected state.

According to a second aspect of the invention there is an apparatus comprising at least one processor and at least one memory storing computer program code. In this aspect the at least one memory with the computer program code is configured with the at least one processor to cause the apparatus to at least: log measurements in the at least one memory while a user equipment comprising the apparatus is in an idle state and while the user equipment is in a connected state according to an extended logged minimization of drive test configuration; and thereafter send uplink a report comprising the measurements logged while the user equipment was in the idle state and while the user equipment was in the connected state.

According to a third aspect of the invention there is a memory storing computer program code comprising code for logging measurements in a user equipment while the user equipment is in an idle state and while the user equipment is in a connected state according to an extended logged minimization of drive test configuration; and code for sending uplink a report comprising the measurements logged while the user equipment was in the idle state and while the user equipment was in the connected state.

According to a fourth aspect of the invention there is a method comprising: configuring a user equipment with an extended logged minimization of drive test configuration in which the configuration remains valid while the user equipment is an idle state and while the user equipment is in a connected state; and thereafter receiving from the user equipment a report comprising measurements collected and logged according to the configuration.

According to a fifth aspect of the invention there is an apparatus comprising at least one processor and at least one memory storing computer program code. In this aspect the at least one memory with the computer program code is configured with the at least one processor to cause the apparatus to at least: configure a user equipment with an extended logged minimization of drive test configuration in which the configuration remains valid while the user equipment is an idle state and while the user equipment is in a connected state; and thereafter receive from the user equipment a report comprising measurements collected and logged according to the configuration.

According to a sixth aspect of the invention there is a memory storing computer program code comprising: code for configuring a user equipment with an extended logged minimization of drive test configuration in which the configuration remains valid while the user equipment is an idle state and while the user equipment is in a connected state; and code for thereafter receiving from the user equipment a report comprising measurements collected and logged according to the configuration.

According to an aspect of the invention, the minimum threshold or thresholds is specified in a written standard. According to an aspect of the invention, the minimum threshold or thresholds is decided by the user equipment. According to an aspect of the invention, the user equipment receives the minimum threshold or thresholds from a network access node via broadcast or dedicated signaling.

According to an aspect of the invention, the sending of the report uplink is in response to receiving from a network access node a report request after sending from the user equipment to the network access node an indication that logged measurements are both available and satisfy one or more minimum thresholds.

DETAILED DESCRIPTION

Figure 1:
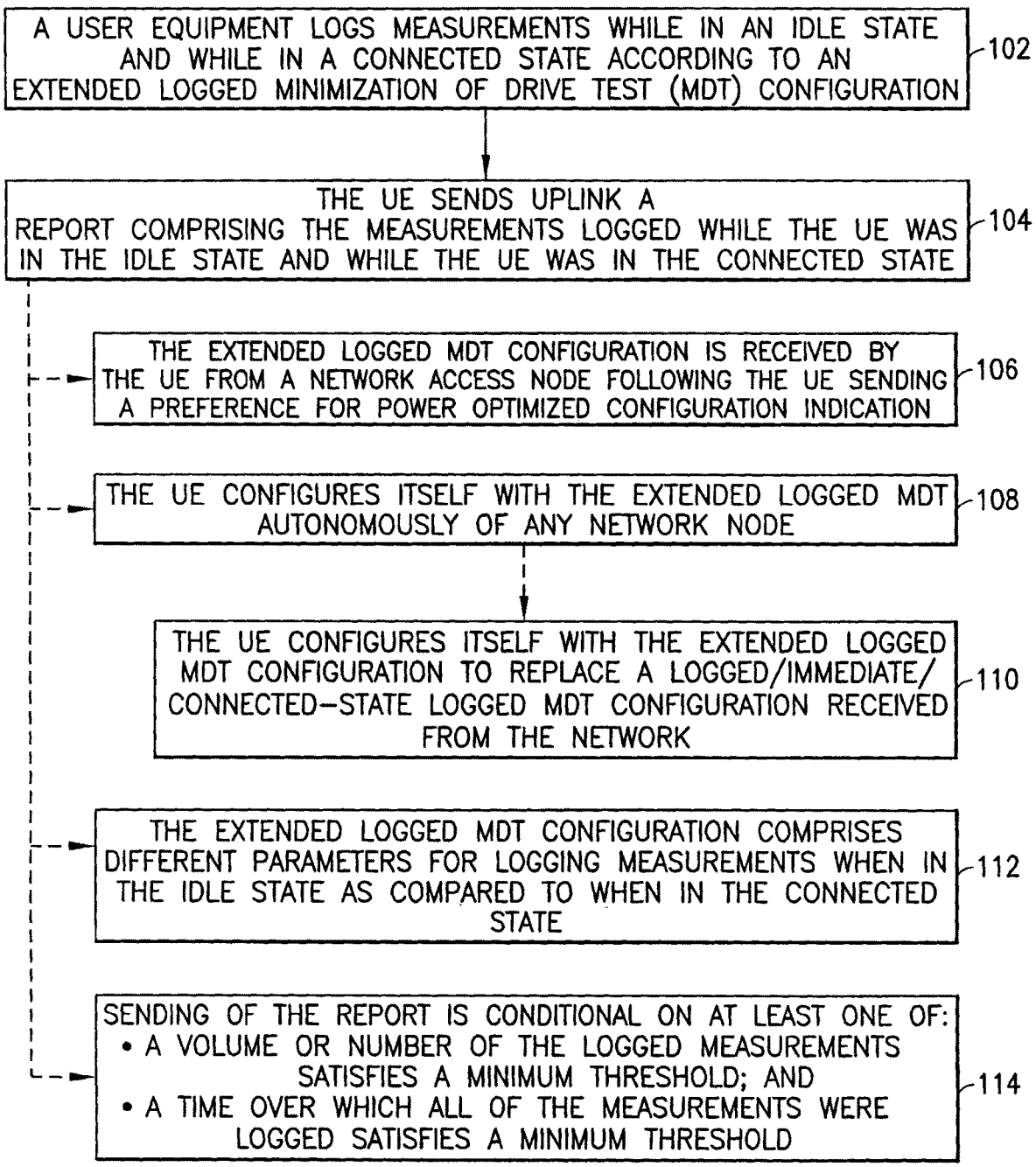
FIG. 1 is a logic flow diagram that illustrates the operation of a method, and a result of execution of computer program instructions embodied on a computer readable memory, in accordance with some exemplary embodiments of this invention.

Consider the case from the background section above in which the network frequently transitions the UE between idle and connected states in order to address the UE's always-on type of applications. When the network configures this UE for logged MDT, the repeated connection setup and release procedures imply the UE will send an "MDT log available" indication each time it logs at least one MDT measurement while in the idle state and then transitions to the connected state. This may give rise to a flood of MDT reporting requests from the network, each initiating for the UE a MDT data retrieval procedure for an MDT report having only a scant number of samples due to the frequent state transitions.

Now consider the alternative case from the background section above in which the network configures the UE with a long DRX cycle to keep its connection alive for the UE's always-on type of applications. Such a UE scheduled for immediate MDT and staying in the connected state for a long time but with intermittent and short data messages exchanged (due to the nature of these always-on applications) will generate a large amount of MDT reports compared to the amount of data that is sent or received. In this case the signaling load is high compared to actual user plane payload.

To address the above deficiencies in conventional MDT practice, according to embodiments of these teachings there is a new MDT mode which is valid for the UE in both the idle state and the connected state. This new mode is also valid across the idle/connected state transitions. For convenience such a new MDT mode is termed herein as an "extended logged MDT" mode. The UE operating in this extended logged MDT mode will perform the MDT measurements and log them regardless of whether the UE is in the idle state or the connected state for any given MDT measurement occasion.

In different implementations of these teachings there are different ways for the UE to enter this extended logged MDT mode. In a first implementation the network decides the UE is to be in this new mode and so specifically configures the UE with parameters for the extended logged MDT mode. In one example, the UE's reported "preference for power optimized configuration" may indicate that the UE is a smart phone and therefore likely to have frequent transitions between the idle and connected states, so the network can use the UE's reported "preference for power optimized configuration" as a trigger to configure the UE for this new extended logged MDT mode.

In another implementation, a UE which has received from the network a configuration for a conventional an MDT mode (i.e., logged MDT mode) is allowed to autonomously enter the extended logged MDT mode. The UE may base its autonomous decision here on its internal operational state, so for example when the UE has begun its power optimized state and has sent the "preference for power optimized configuration" indication the UE can autonomously change its configuration from the (logged) MDT configuration it received from the network to the extended logged MDT configuration described above. In another exemplary embodiment the UE is allowed to autonomously change from the network-provided (conventional) MDT configuration to the extended logged MDT configuration and thereafter send its "preference for power optimized configuration" indication, which the network recognizes as being reported after the UE's autonomous MDT configuration change. In these two implementations the UE signals the network with its "preference for power optimized configuration" indication. But in another implementation the UE is not required to send this indication because the network will recognize that the UE has autonomously entered this extended logged MDT mode whenever it receives the next MDT report from the UE which will not be according to the parameters of the MDT mode that the network previously configured for it. In both cases the network can unambiguously know that the UE is in the extended logged MDT mode regardless of whether the UE signals the network with the indication of its preference for power optimized configuration. In any case, the UE autonomously changing the MDT configuration that it received from the network to the extended logged MDT mode will not adversely impact network operations because the MDT results will still be reported normally; namely the UE sends an "MDT log available" indication and reports the MDT log in response to receiving from the network a MDT reporting request. Below are some considerations for how this reporting can be modified a bit, according to some embodiments of these teachings.

Unlike the conventional immediate MDT or logged MDT modes, the configuration for the extended logged MDT mode may include separate parameters for logging measurements when the UE is in the connected state and when it is in the idle state. For example, such different parameters may define measurement quantities, logging events (e.g. periodicities), and the like. In one embodiment the parameters for the extended logged MDT mode are signaled by the network in dedicated signaling or in system information (for example, in a system information block SIB). In an alternative embodiment there are default parameters for the extended logged MDT mode. In one example these default parameters re-use at least the default parameters for the immediate MDT mode for those times when the UE is in the connected state and for the logged MDT mode for those times when the UE is in the idle state. Such re-used default configuration parameters are for at least the radio measurements (e.g. Reference Signal Received Power RSRP, Reference Signal Received Quality RSRQ) that are utilized to control the UE mobility (e.g. determine whether UE needs a handover to another controlling network node). Whether default or specifically configured, in an embodiment the logging periodicities may be autonomously adapted by the UE in each UE's state appropriately to match with its DRX periods in the DRX cycle and in the paging cycle in order to eliminate the need for the UE to wake up for MDT measurements during a time when its DRX cycle allows it to sleep.

In another implementation of the new extended logged MDT mode, the configuration allows for the UE to log only when it is in the connected state and while the UE is in the idle state the UE need not collect any MDT measurements. Leaving the measurement configuration 'empty' during the times when the UE is in the idle state particularly allows the extended logged MDT configuration to survive the UE's transitions from connected to idle states, so that the UE can continue logging MDT measurements when it later returns to the connected state without the need to be configured for MDT again by the network. In this case the UE would of course be collecting MDT measurements only while it is in a connected state, but such MDT measurements are useful for the network for verifying quality of service (QoS) since it may not obtain a sufficient number of MDT samples for this purpose from other UEs configured for MDT reporting, which is sometimes the case in LTE Release 10 deployments.

In conventional practice for logged MDT the UE sends to the network an "MDT log available" indication whenever the UE transitions from the idle state in which the MDT measurements were collected to the connected state in which the MDT log can be reported. But as noted above, the always-on applications can lead to frequent state transitions and few MDT measurements to report on each transition from idle to connected state. Such limited results are only marginally useful to the network and additionally this represents too high of a control signaling burden. For this reason embodiments of these teachings utilize new reporting triggers for the UE in the extended logged MDT mode to avoid the reporting of only small amounts of logged MDT measurements.

Specifically, according to these embodiments there is a minimum MDT threshold which must be satisfied before the UE sends to the network its "MDT log available" indication. Conventionally the UE will only send this indication when it is in the RRC connected state or transitioning from the idle state to the RRC connected state and this condition continues with these embodiments. This minimum threshold may be implemented as a minimum time over which the UE has been logging MDT measurements, or it may be a minimum volume of data in the MDT log or a minimum number of (distinct) samples in the MDT log. In these cases the minimum threshold is met when the configured minimum logging duration timer expires or when the data volume/number of samples exceeds the threshold.

These time and log size minimum thresholds can also be configured by the network with the other parameters for the extended logged MDT mode (e.g., dedicated signaling or broadcast/system information), or they may be default minimums such as might be published in a radio standard and not need signaling between the network and the UE. The minimum MDT log size threshold may be generic for every type of UE or it may be specific per UE type.

As compared to the conventional logged MDT mode, in these cases the UE will defer sending the "MDT log available" indication until the minimum threshold is met. Deferring the sending of its "MDT log available" indication to the network may be conditional on the UE's indication of its preference for power optimized configuration. For example, the UE can be allowed to suspend sending to the network its "MDT log available" indication upon transitioning from idle to connected states only if it has sent its indication of its preference for power optimized configuration. This suspension would then continue until the minimum threshold detailed above is met.

From the network's perspective, the network may skip the MDT log retrieval procedure if the UE has indicated its preference for power optimized configuration and there are frequent state transitions with "MDT log available" indications from the UE. This would also minimize the control signaling which as noted above could grow excessive in conventional MDT practice.

In an alternative embodiment, rather than adapting the conventional "MDT log available" indication as above there is a new indication defined for the MDT log retrieval which is only used for the extended logged MDT mode. Whereas the conventional "MDT log available" indication informs the network that the UE has logged MDT results available to report, this separate indicator for only the extended logged MDT mode informs the network that the UE has logged MDT results which are not only available but also ready for retrieval (e.g., the logged results are not only available but they satisfy the minimum threshold above). This new logged MDT results ready indicator can also be used in conjunction with the conventional MDT results available indicator to inform the network of different conditions; the latter for when the extended logged MDT results are available but do not satisfy the minimum threshold and the former for when they do.

By the above teachings the network is able to make the MDT data collection more effective in several respects. Having the extended logged MDT mode as an option eliminates unnecessary immediate MDT configurations for a UE which will be in the connected state only for a short period of time (such as due to infrequent small packet transmissions). This new extended logged MDT mode enables the network to make an appropriate configuration when the connection is kept alive for the UE which remains in the connected state by enabling the reporting of MDT results to occur outside the UE's DRX sleep periods. And the extended logged MDT mode also allows a more appropriate configuration for terminals having frequent state transitions due to characteristics of the generated traffic. And also while applying the principles for UE selection for MDT and the MDT configuration itself, UE power consumption can be minimized by allowing the same MDT sleep times for the UE in between the MDT measuring times as is used for the UE's conventional DRX cycle.

Trace function can be extended to support extended logged MDT mode covering both connected and idle states. In current practice the MDT configuration originates at an Operations and Maintenance center of the network which starts an MDT session using trace functionality to nodes of the radio access network (RAN). These nodes use the trace functionality to initiate traces (MDT data in this case) which are collected by the TCE noted above in the background section. Another option is to use current logged MDT Trace activation and the new operation is specified (as described above) only in the RAN level. The data forwarding to the TCE can happen the same way as currently in both cases. Also the log reporting can use the same signalling (UE information request/response—signalling).

In summary of the above teachings, FIG. 1 is a logic flow diagram that illustrates the operation of a method, and a result of execution of computer program instructions, in accordance with the exemplary embodiments of this invention from the perspective of the user equipment. Such a method may be executed by one or more components of the user equipment or by the entire mobile terminal/user equipment itself. Dashed lines indicate optional elements. In accordance with these exemplary embodiments at block 102 a user equipment logs measurements while the UE is in an idle state and while the UE is in a connected state according to an extended logged minimization of drive test configuration. Afterwards at block 104 the UE sends uplink a report comprising the measurements logged while the UE was in the idle state and while the UE was in the connected state.

Further portions of FIG. 1 summarize some of the various non-limiting implementations that are detailed more particularly above. Block 106 summarizes one implementation option in which the extended logged MDT configuration is received by the UE from a network access node following the UE sending to the network access node a preference for power optimized configuration indication.

Alternative to block 106 is block 108 wherein the UE configures itself with the extended logged MDT configuration, autonomously of any network access node. Further detail for block 108 is provided at block 110 which summarizes that the UE configures itself with the extended logged MDT configuration to replace one of a logged MDT configuration, an immediate MDT configuration, and a connected state logged MDT configuration, any of which the UE received from the network access node.

Block 112 summarizes that the extended logged MDT configuration comprises different parameters for logging measurements while in the idle state as compared to while in the connected state. One example of this is where a measurement logging periodicity parameter for logging measurements while the UE is in at least one of the idle and connected states is adjusted by the UE to match a respective paging or discontinuous DRX reception periodicity which is configured for the UE by the network.

Further in the above teachings, block 114 reviews that the UE's sending of the report uplink is conditional on at least one of: a volume or number of the logged measurements satisfying a minimum threshold; and a time over which all of the measurements were logged satisfies a minimum threshold. More specific to an example above, sending of the report is in response to the UE receiving a report request after the UE sends an indication that logged measurements are both available and satisfy the minimum threshold (or more than one minimum threshold). In various embodiments the minimum threshold or thresholds can be a part of the extended logged MDT configuration, such threshold(s) may be published in a wireless radio access technology standard, or decided by the UE itself, or the UE may receive it/them from the network access node in broadcast or dedicated signaling. The value of the minimum threshold(s) may depend on whether the UE sent its preference for power optimized configuration indication, so for example there can be different minimum thresholds for two (or more) different power preferences modes of the UE.

Figure 2:
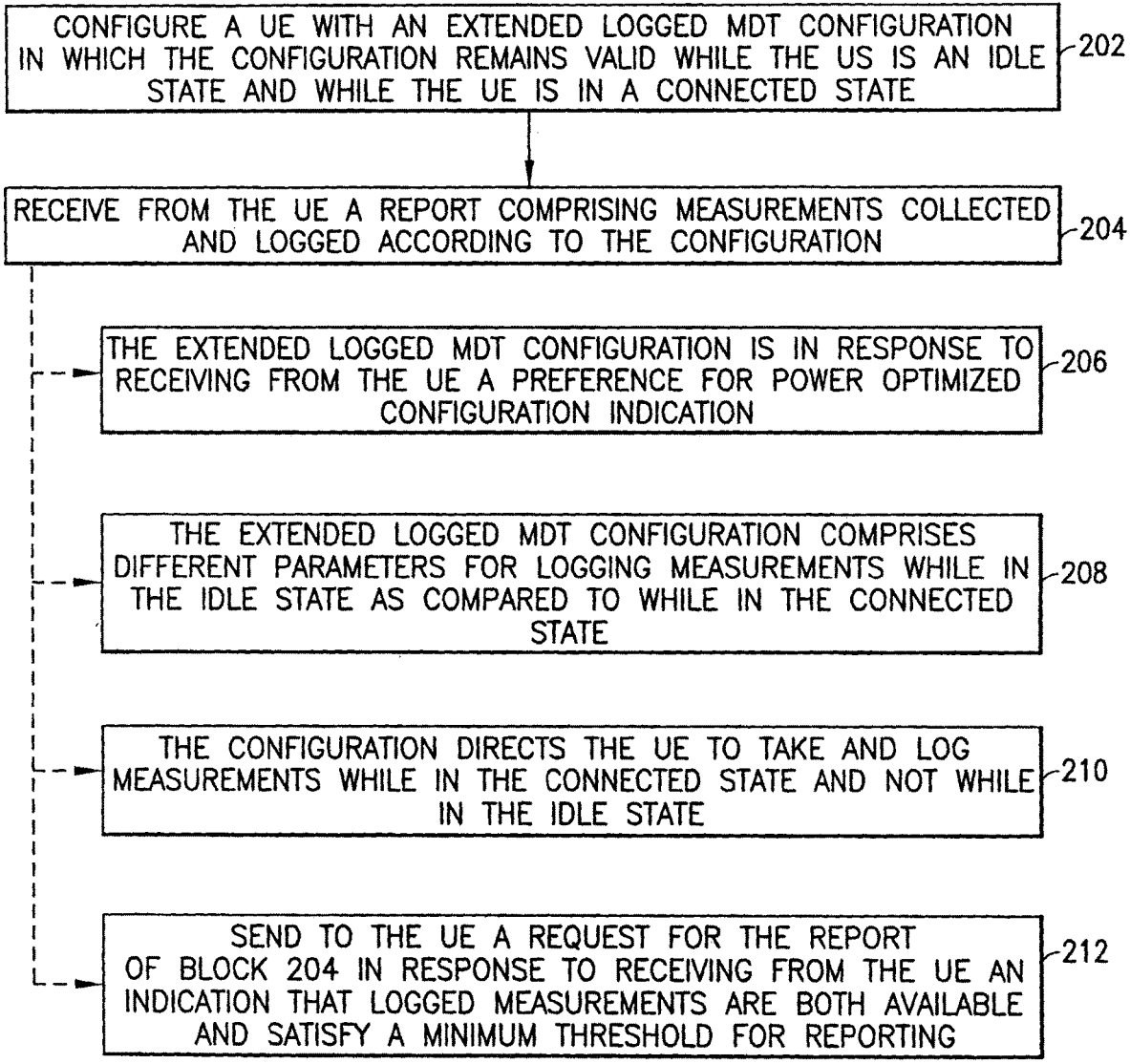
FIG. 2 is a logic flow diagram that illustrates the operation of a method, and a result of execution of computer program instructions embodied on a computer readable memory, in accordance with other exemplary embodiments of this invention.

To further summarize the above teachings, FIG. 2 is a logic flow diagram that illustrates the operation of a method, and a result of execution of computer program instructions, in accordance with the exemplary embodiments of this invention from the perspective of the network access node. Such a method may be executed by one or more components of an access node/base station, or by the entire access node itself. Dashed lines indicate optional elements. In accordance with these exemplary embodiments at block 202 the network access node configures a UE with an extended logged MDT configuration in which the configuration remains valid while the UE is an idle state and while the UE is in a connected state. Then at block 202 the network access node receives from the UE a report comprising measurements collected and logged according to the configuration.

Further portions of FIG. 2 summarize some of the various non-limiting implementations that are detailed more particularly above. At block 206 the network configures the UE with the extended logged MDT configuration in response to receiving from the UE a preference for power optimized configuration indication. At block 208 the extended logged MDT configuration comprises different parameters for logging measurements while in the idle state as compared to while in the connected state. Block 210 repeats a very particular implementation in which the configuration directs the UE to log measurements while in the connected state and not while in the idle state. And finally at block 212 the network sends to the UE a request for the report stated at block 204 and in response receives from the UE an indication that logged measurements are both available and satisfy a minimum threshold for reporting.

Figure 3:
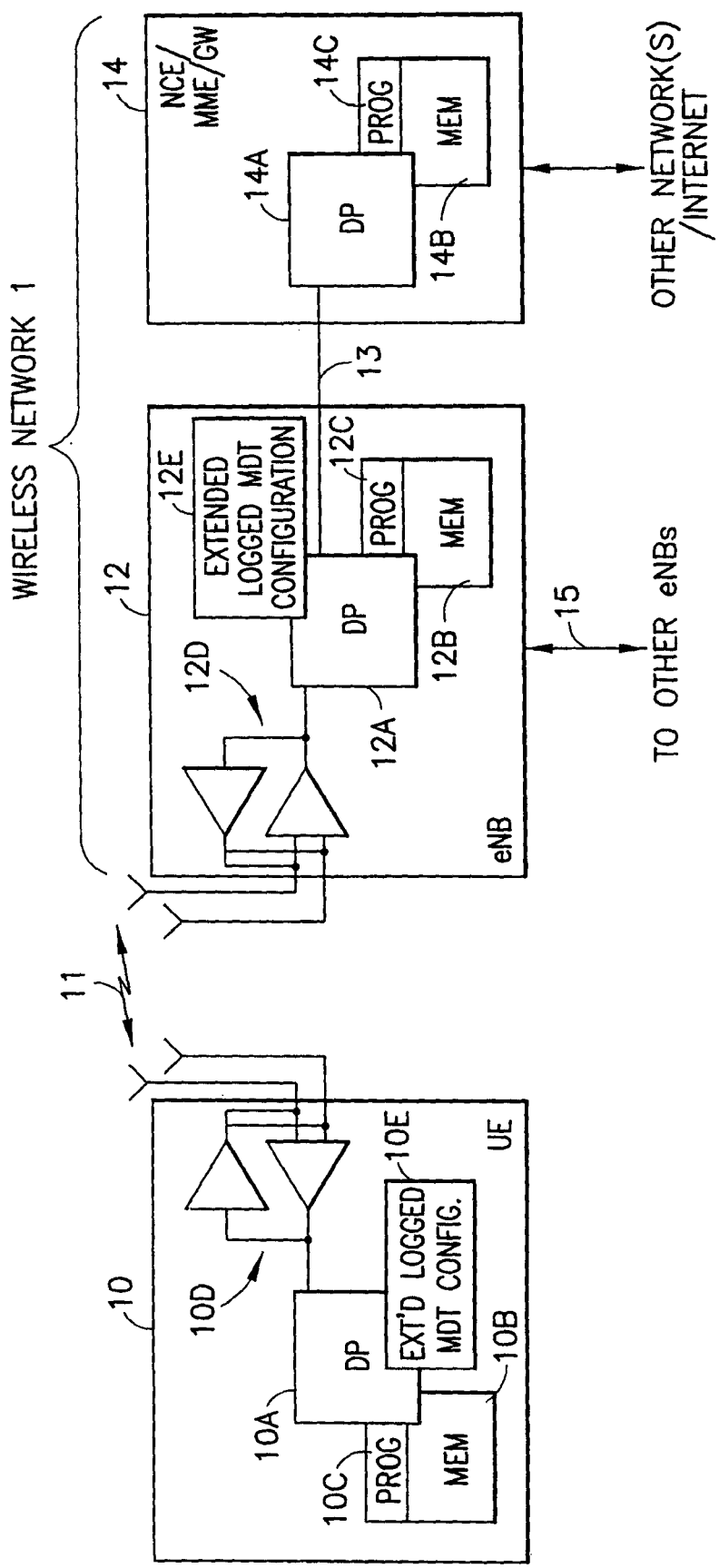
FIG. 3 shows a simplified block diagram of certain apparatus according to various exemplary embodiments of the invention.

Reference is now made to FIG. 3 for illustrating a simplified block diagram of various electronic devices and apparatus that are suitable for use in practicing the exemplary embodiments of this invention. In FIG. 3 a wireless network 1 is adapted for communication over a wireless link 11 with an apparatus, such as a mobile communication device which above is referred to as a UE 10, via a wireless network access node, such as a base station or relay station or remote radio head, and more specifically shown as an eNodeB 12. The network 1 may include a network control element (NCE) 14 that serves as a mobility management entity MME and/or a serving gateway S-GW to a broader network such as a public switched telephone/data network and/or the Internet.

The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transmitter and receiver 10D for bidirectional wireless communications with the eNodeB 12 via one or more antennas. The eNodeB 12 also includes a controller, such as a computer or a data processor (DP) 12A, a computer-readable memory medium embodied as a memory (MEM) 12B that stores a program of computer instructions (PROG) 12C, and a suitable RF transmitter and receiver 12D for communication with the UE 10 via one or more antennas. The eNodeB 12 is coupled via a data/control path 13 to the NCE 14. The path 13 may be implemented as the S1 interface in the case the network 1 is an LTE network. The eNodeB 12 may also be coupled to another eNodeB via data/control path 15, which may be implemented as the X2 interface in the case the network 1 is an LTE network.

At least one of the PROGs 100 and 12C is assumed to include program instructions that, when executed by the associated DP, enable the device to operate in accordance with the exemplary embodiments of this invention as was detailed by non-limiting example above with respect to FIGS. 1 and 2. That is, the exemplary embodiments of this invention may be implemented at least in part by computer software executable by the DP 10A of the UE 10 and/or by the DP 12A of the eNodeB 12, or by hardware, or by a combination of software and hardware (and firmware).

For the purposes of describing the exemplary embodiments of this invention the UE 10 may be assumed to also include a program or algorithm 10E for implementing the extended logged MDT configuration that is provided to it by the network 1 or that it adopts autonomously. Similarly the eNodeB 12 may also include its own algorithm or program 12E for implementing the extended logged MDT configuration according to the various embodiments detailed more particularly above.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Note that the various DPs 10A, 12A may be implemented as one or more processors/chips, either or both of the UE 10 and the eNodeB 12 may include more than one transmitter and/or receiver 10D, 12D, and particularly the eNodeB 12 may have its antennas mounted remotely from the other components of the eNodeB 12, such as for example tower-mounted antennas.

Specific apparatus for performing the steps at FIGS. 3-4 may include sending and receiving means for sending and receiving as stated at blocks 104 and 204 of FIGS. 1 and 2, and controlling means for implementing the extended logged MDT configuration. In a particular embodiment the receiving means may be embodied in at least a receiver 10D/12D and the controlling means may be embodied in at least a processor 10A/12A, both of which are illustrated at FIG. 3. Another specific apparatus may include at least one processor 10A/12A and at least one memory 10B/12B including computer program code 10C/10E/12C/12E, in which the memory and the computer program code are configured with the at least one processor to cause the apparatus at least to perform the steps shown at FIGS. 1-2.

The various blocks shown in FIGS. 1-2 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. For example, while the exemplary embodiments have been described above in the context of advancements to the 3GPP LTE system, it should be appreciated that the exemplary embodiments of this invention are not limited for use with only this one particular type of wireless communication system. The exemplary embodiments of the invention presented herein are explanatory and not exhaustive or otherwise limiting of the scope of the invention.

We claim:

1. A method comprising:
   entering, by a user equipment, a measurement mode employing an extended logged minimization of drive test (MDT) mode configuration configuring the user equipment to log measurements both in an idle state and in a connected state;
   logging, by the user equipment, measurements in the measurement mode both in the idle state and in the connected state in accordance with the extended logged MDT mode configuration, said extended logged MDT mode configuration being valid both in the idle state and in the connected state, wherein the method comprises:
   receiving, at the user equipment from a network, parameters for logging measurements, the parameters including a parameter defining periodicity for logging the measurements, and wherein
   measurement times for performing, by the user equipment, the measurements in at least one of the idle and connected states are adjusted to match a respective discontinuous reception cycle of the user equipment, as configured by the network access node, and the method comprises:
   logging the measurements in the user equipment in accordance with the periodicity defined by the received parameter defining periodicity for logging the measurements;
   sending uplink to the network a new indicator used only in the extended logged MDT mode, the new indicator indicating that the user equipment has logged MDT measurements which are both available and satisfy a minimum threshold; and
   sending uplink to a network access node a report including the measurements logged while the user equipment was in the idle state and while the user equipment was in the connected state.

2. The method according to claim 1, wherein the extended logged MDT mode configuration is received from the network access node.

3. The method according to claim 2, wherein the extended logged MDT mode configuration is received after sending to the network access node a preference for power optimized configuration indication.

4. The method according to claim 1, wherein the extended logged MDT mode configuration is configured autonomously of any network access node.

5. The method according to claim 4, wherein the extended logged MDT mode configuration is configured autonomously after indicating a preference for power optimized configuration to a network access node.

6. The method according to claim 4, wherein the extended logged MDT mode configuration is configured to replace one of a logged minimization of drive test configuration, an immediate minimization of drive test configuration, and a connected state logged minimization of drive test configuration received from a network access node.

7. The method according to claim 1, wherein the extended logged MDT mode configuration includes parameters for logging measurements in the idle state different from parameters for logging measurements in the connected state.

8. The method according to claim 1, wherein the sending of the report uplink to the network access node is conditioned on at least one of:
   a volume or number of the logged measurements satisfying a minimum threshold; and
   a time over which all of the logged measurements were logged satisfying a minimum threshold.

9. The method according to claim 8, wherein the minimum threshold or thresholds is included in the extended logged MDT mode configuration.

10. The method according to claim 8, wherein the minimum threshold or thresholds depends on whether a preference for power optimized configuration indication has been sent to the network access node.

11. An apparatus comprising:
    at least one processor; and
    at least one memory storing computer program code, wherein the at least one memory with the computer program code is configured with the at least one processor to cause the apparatus at least to:
    enter a measurement mode employing an extended logged minimization of drive test (MDT) mode configuration configuring the apparatus to log measurements both in an idle state and in a connected state;
    receive, from a network, parameters for logging measurements, the parameters including a parameter defining periodicity for logging the measurements;
    perform measurements in at least one of the idle and connected states, wherein performing the measurements is adjusted to match a respective discontinuous reception cycle of the apparatus as configured by the network access node;
    log measurements in the measurement mode in the at least one memory while the apparatus is both in the idle state and in the connected state in accordance with the extended logged MDT mode configuration, said extended logged MDT mode configuration being valid both in the idle state and in the connected state;
    log the measurements in accordance with the periodicity defined by the received parameter defining periodicity for logging the measurements;
    send uplink to the network a new indicator used only in the extended logged MDT mode, the new indicator indicating that the user equipment has logged MDT measurements which are both available and satisfy a minimum threshold; and
    send uplink to a network access node a report including the measurements logged while the apparatus was in the idle state and while the apparatus was in the connected state.

12. The apparatus according to claim 11, wherein the extended logged MDT mode configuration is received by the apparatus from the network access node.

13. The apparatus according to claim 12, wherein the extended logged MDT mode configuration is received by the apparatus after sending to the network access node a preference for power optimized configuration indication.

14. The apparatus according to claim 11, wherein the at least one memory with the computer program code is further configured with the at least one processor to cause the apparatus to configure itself with the extended logged MDT mode configuration autonomously of any network access node.

15. An apparatus comprising:
    at least one processor; and
    at least one memory storing computer program code, wherein the at least one memory with the computer program code is configured with the at least one processor to cause the apparatus at least to:
    cause a user equipment to enter a measurement mode employing an extended logged minimization of drive test (MDT) mode configuration, said extended logged MDT mode configuration configuring the user equipment to perform and log measurements both in an idle state and in a connected state, wherein measurement times of the user equipment for performing the measurements in at least one of the idle and connected states are adjusted to match a respective discontinuous reception cycle of the user equipment, as configured by the apparatus;

send, to the user equipment, parameters for logging measurements, the parameters including a parameter defining periodicity for logging the measurements;

receive from the user equipment a new indicator used only in the extended logged MDT mode, the new indicator indicating that the user equipment has logged MDT measurements which are both available and satisfy a minimum threshold; and receive from the user equipment a report including measurements collected and logged by the user equipment while the user equipment was in the idle state and while the user equipment was in the connected state in accordance with said extended logged MDT mode configuration, wherein the measurements are logged in accordance with the periodicity defined by the parameter, defining periodicity for logging the measurements, sent to the user equipment.

16. The apparatus according to claim 15, wherein the apparatus configures the user equipment with the extended logged MDT mode configuration in response to receiving from the user equipment a preference for power optimized configuration indication.

17. The apparatus according to claim 15, wherein the extended logged MDT mode configuration includes parameters for logging measurements in the idle state different from parameters for logging measurements in the connected state.

18. The apparatus according to claim 15, wherein the extended logged MDT mode configuration directs the user equipment to log measurements in the connected state and not in the idle state.

19. The apparatus according to claim 15, wherein the at least one memory with the computer program code is configured with the at least one processor to cause the apparatus further to send to the user equipment a request for the report in response to receiving from the user equipment the new indication.

20. The method according to claim 1 further comprising maintaining the extended logged MDT mode configuration valid across state transitions between the idle state and the connected state.

21. The apparatus according to claim 11, wherein the at least one memory with the computer program code is further configured with the at least one processor to cause the apparatus to:

maintain the extended logged MDT mode configuration valid across state transitions between the idle state and the connected state.

22. The apparatus according to claim 15, wherein the at least one memory with the computer program code is further configured with the at least one processor to cause the apparatus to:

cause the user equipment to maintain the extended logged MDT mode configuration valid across state transitions between the idle state and the connected state.

* * * * *